(12) United States Patent
Wilke

(10) Patent No.: US 10,460,627 B1
(45) Date of Patent: Oct. 29, 2019

(54) NON-CONSUMABLE RESPIRATOR TRAINING FILTER

(71) Applicant: U.S. Army Edgewood Chemical Biological Center, APG, MD (US)

(72) Inventor: Douglas E. Wilke, Joppa, MD (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 554 days.

(21) Appl. No.: 15/392,007

(22) Filed: Dec. 28, 2016

(51) Int. Cl.
*G09B 25/00* (2006.01)
*A62B 9/02* (2006.01)
*A62B 23/02* (2006.01)

(52) U.S. Cl.
CPC ............... *G09B 25/00* (2013.01); *A62B 9/02* (2013.01); *A62B 23/02* (2013.01)

(58) Field of Classification Search
CPC .. A62B 9/02; A62B 9/027; A62B 7/10; A62B 19/00; A62B 23/00; A62B 23/02; A62B 23/032; A62B 18/10; A62B 7/00
See application file for complete search history.

(56) References Cited

U.S. PATENT DOCUMENTS

| 2007/0017509 A1* | 1/2007 | Emricson | A62B 99/00 128/201.24 |
| 2016/0129286 A1* | 5/2016 | Danford | A62B 18/10 128/206.21 |
| 2017/0340906 A1* | 11/2017 | Dickstein | A62B 18/02 |

FOREIGN PATENT DOCUMENTS

GB    2169810 A   *   7/1986   ............. A62B 27/00

* cited by examiner

*Primary Examiner* — Samchuan C Yao
*Assistant Examiner* — Jennifer L Korb
(74) *Attorney, Agent, or Firm* — Ulysses John Biffoni

(57) ABSTRACT

A training filter includes an upper shell having a substantially central hole; a lower shell adjoined to the upper shell; and a plug positioned in the substantially central hole and extending through the lower shell, wherein the plug includes a top wall having a plurality of apertures; a valve adjacent to the top wall and the plurality of apertures; the plug defining a hollow breathing resistance core adjacent to the valve; an angled sidewall flanking the breathing resistance core; and a connection mechanism connected to the plug opposite the top wall. The training filter duplicates the weight, size, shape, and breathing resistance of an actual filter and is reusable and cleanable without a shelf life unlike an actual filter.

21 Claims, 9 Drawing Sheets

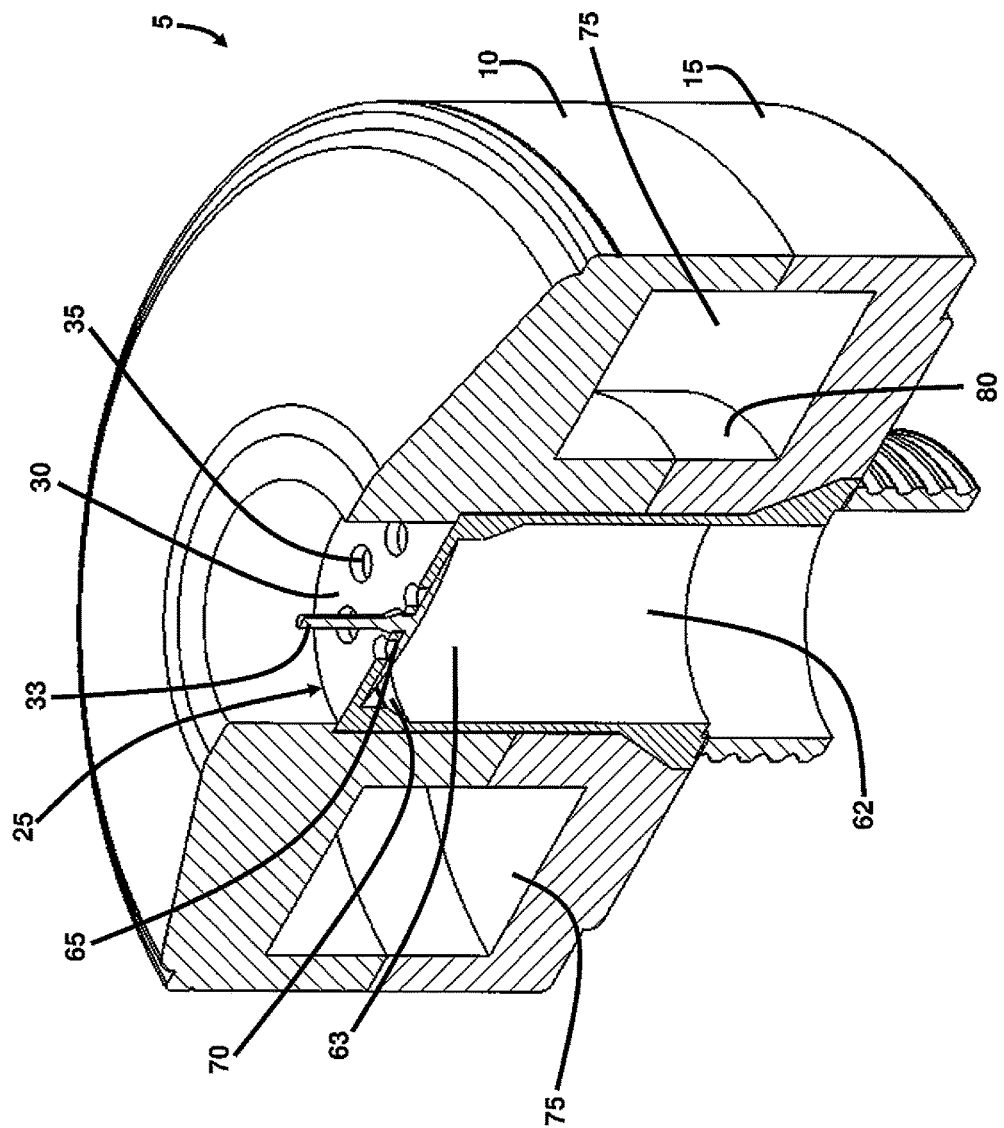

NON-CONSUMABLE RESPIRATOR TRAINING FILTER

GOVERNMENT INTEREST

The embodiments herein may be manufactured, used, and/or licensed by or for the United States Government without the payment of royalties thereon.

BACKGROUND

Technical Field

The embodiments herein generally relate to filters, and more particularly to filters used in respirators.

Description of the Related Art

Respirator users perform a variety of tasks with a respirator in potentially hazardous environments. Operating a respirator incorrectly or knocking the respirator loose in a hazardous environment can be deadly. To prevent mistakes, training in a safe environment while wearing a respirator is helpful, and often required by employers, to understand the performance limitations of wearing a respirator. Some examples include: shouldering and sighting a weapon, operating a vehicle, physical mobility and physical exertion limitations, and maneuvering in confined spaces. These tasks may become harder because respirators can limit the user's field of view, increase breathing resistance, increase head borne weight and neck fatigue, physically interfere with a user's other equipment/environment, or cause other hardships to the user.

In order to provide effective training, the user must typically experience as many realistic conditions as possible, which requires the user to have a filter in place and feel the breathing resistance the filter would provide. All filters have a limitation in their service life, which begins to degrade when exposed to a number of environmental conditions including humidity and ambient particulates. These conditions degrade filter life, performance, or completely consume the filtration capacity, regardless of the training environment's toxicity. Using a consumable filter in a training environment that doesn't require filtration creates a cost and disposal burden which is preferably avoidable.

Currently there are many different types of training oral nasal masks that simulate breathing at high altitudes, or increase breathing resistance. These masks are generally targeted towards physical fitness training. While it might be possible to find a training mask whose breathing resistance is similar to a filter canister and respirator combination, the training masks do not simulate wearing a full face piece respirator with filter canister.

SUMMARY

In view of the foregoing, an embodiment herein provides a training filter comprising an upper shell having a substantially central hole or port; a lower shell adjoined to the upper shell; and a plug positioned in the substantially central hole and extending through the lower shell, wherein the plug comprises: a top wall having a plurality of apertures; a valve adjacent to the top wall and the plurality of apertures; the plug defining a hollow breathing resistance core or chamber adjacent to the valve; an angled sidewall flanking the breathing resistance core adjacent the valve; and a connection mechanism connected to the plug opposite the top wall. The valve may comprise a stem outwardly extending from the top wall of the plug. The connection mechanism may comprise a hole creating a continuous air path from the plurality of apertures through the hollow breathing resistance core and through the connection mechanism. The training filter may further comprise a ballast surrounding the plug. The upper shell and the lower shell may comprise an air pocket surrounding the ballast. The valve may comprise a flapper valve. The valve and the angled sidewall may be configured to alter a breathing resistance through the plug. The plurality of apertures may be arranged in a pattern. The plurality of apertures and the angled sidewall may be configured to match a breathing resistance of a non-training filter. The angled sidewall, the pattern of the plurality of apertures, a predetermined number of the plurality of apertures, and the valve may be configured to alter the breathing resistance of the training filter to match that of an actual respirator filter. The connection mechanism may outwardly protrude from the lower shell and be adapted to connect to a respirator.

Another embodiment provides a reusable training filter comprising a first shell having a hole or port; a second shell adjoined to the first shell; a plug positioned in the hole and extending through the second shell, wherein the plug comprises: a valve seat comprising at least one aperture; a valve adjacent to the valve seat and the at least one aperture; the plug defining a hollow breathing resistance chamber or core adjacent to the valve; an angled upper sidewall flanking the breathing resistance core; and a connector connected to the plug at an end opposite the top wall. The filter further comprises a ballast surrounding the plug, wherein the first shell and the second shell comprise an air pocket surrounding the ballast. The valve may comprise a stem outwardly extending from the valve seat of the plug. The connector may comprise a hole creating a continuous air flow path from the at least one aperture through the hollow breathing resistance core and the connector.

The valve may comprise a flapper valve. The valve and the angled upper sidewall may be configured to alter a breathing resistance through the plug. The at least one aperture may comprise a plurality of apertures arranged in a pattern. The plurality of apertures and the angled upper sidewall may be configured to match a breathing resistance of a non-training filter. The angled upper sidewall, the pattern of the plurality of apertures, and a predetermined number of the plurality of apertures may be configured to alter the breathing resistance to match that of an actual respirator filter. The connector may outwardly protrude from the second shell.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 6 is a cross-sectional perspective view of the training filter of FIG. 1 according to an embodiment herein;

DETAILED DESCRIPTION

Figure 1:
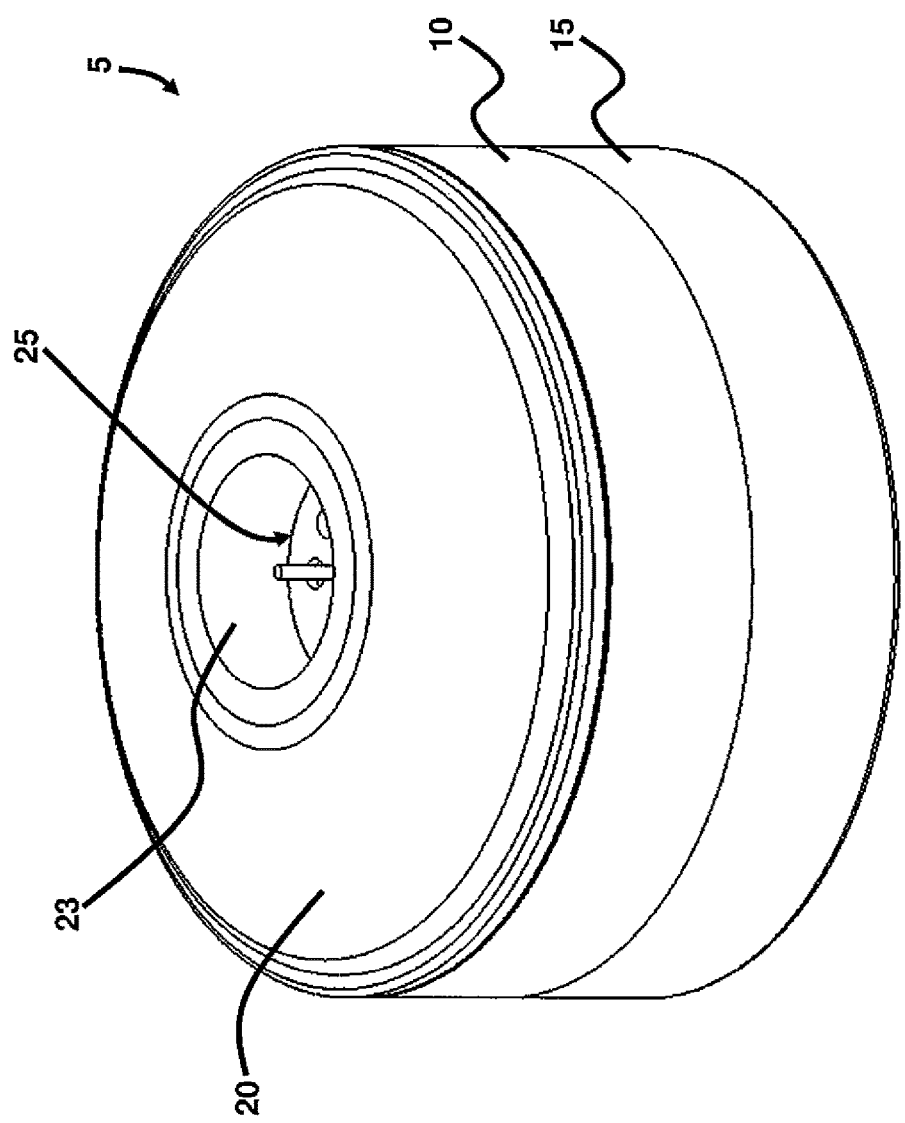
FIG. 1 is a perspective view of a training filter according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein provide a non-consumable respirator training filter. Referring now to the drawings, and more particularly to FIGS. 1 through 9, where similar reference characters denote corresponding features consistently throughout the figures, there are shown preferred embodiments.

Figure 2:
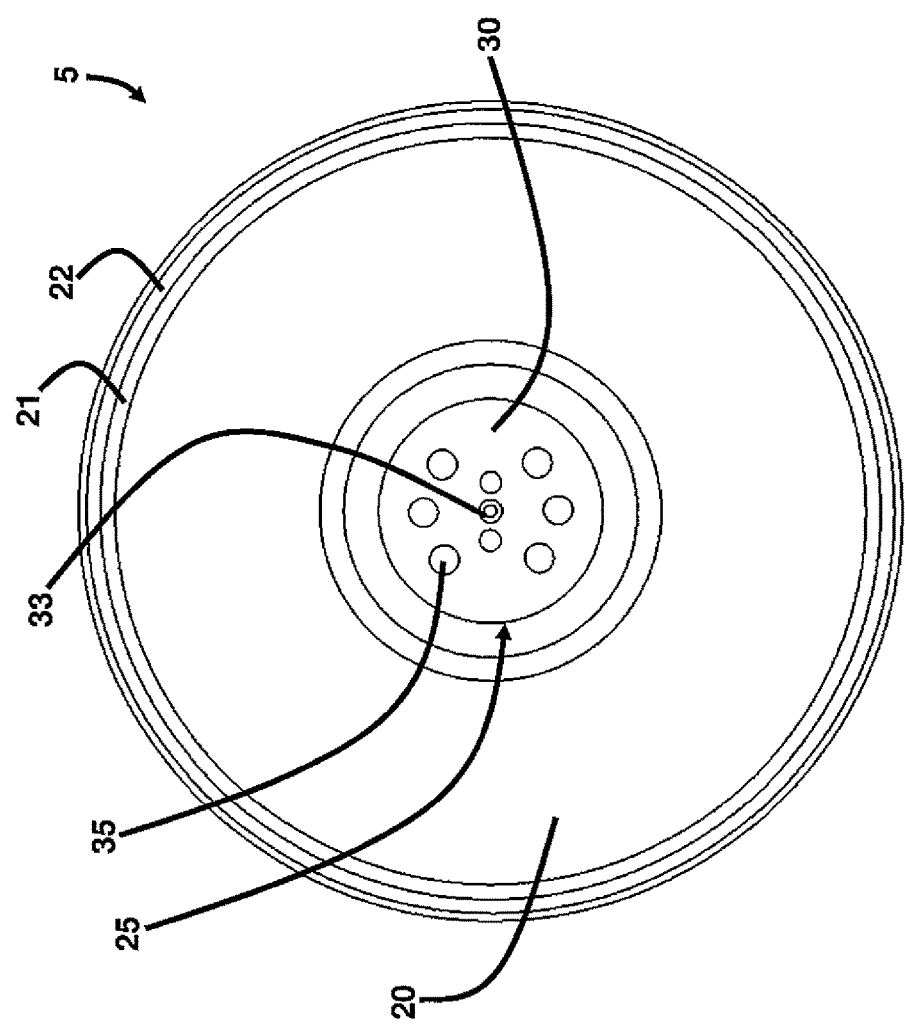
FIG. 2 is a top view of the training filter of FIG. 1 according to an embodiment herein.
Figure 3:
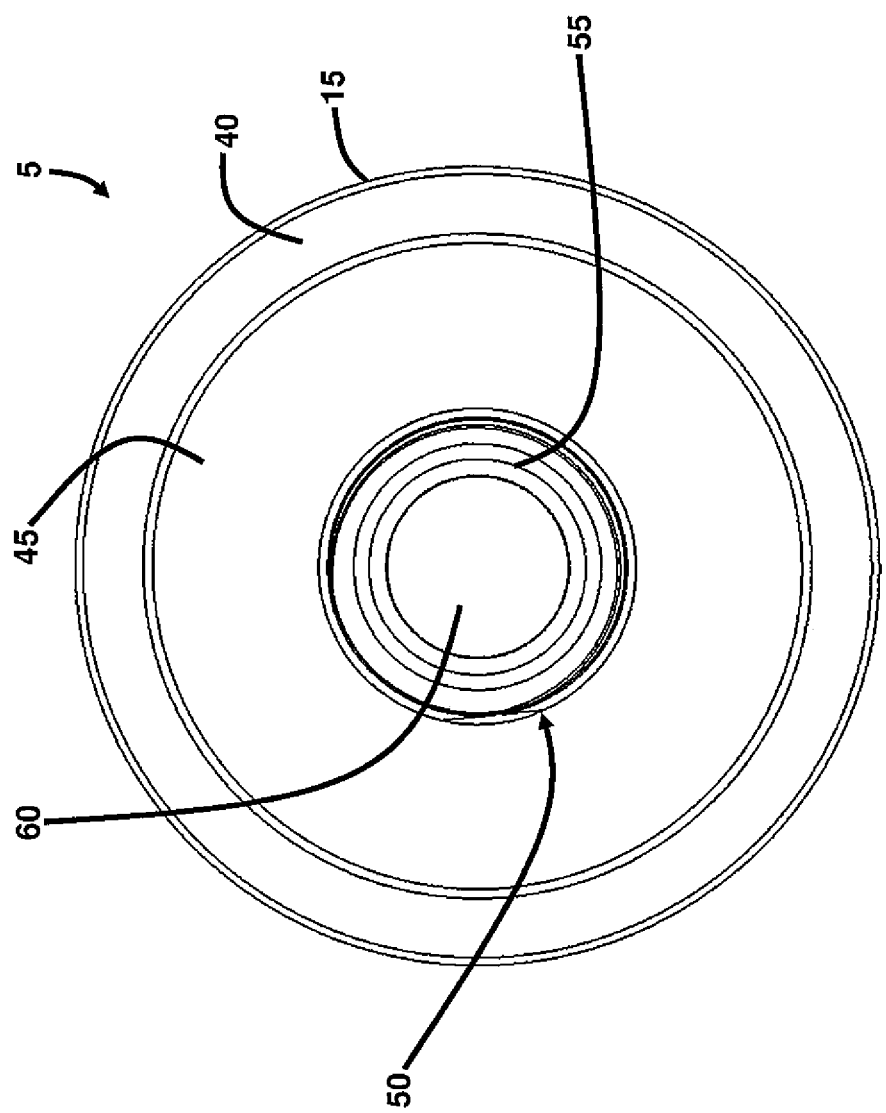
FIG. 3 is a bottom view of the training filter of FIG. 1 according to an embodiment herein.
Figure 4:
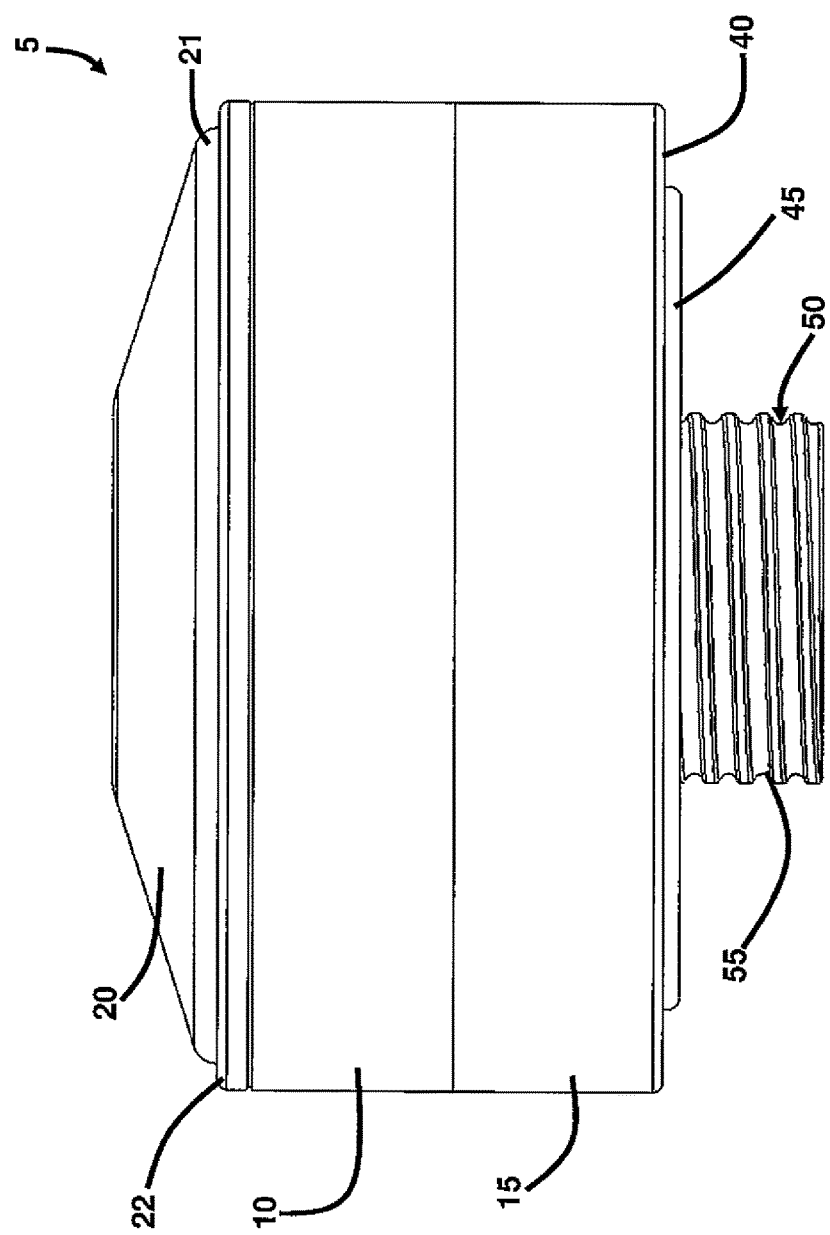
FIG. 4 is a side view of the training filter of FIG. 1 according to an embodiment herein.
Figure 5:
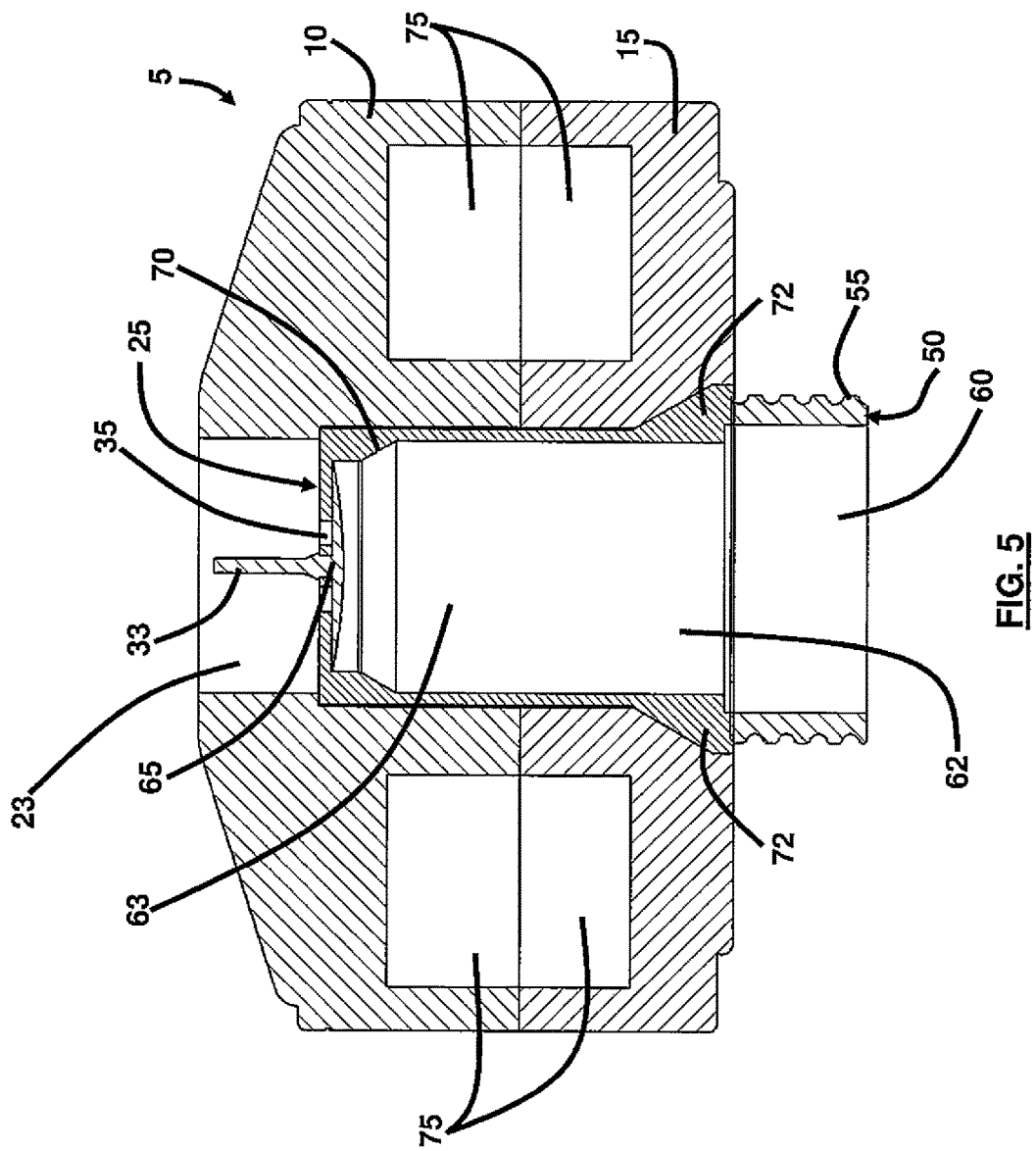
FIG. 5 is a cross-sectional side view of the training filter of FIG. 1 according to an embodiment herein.
Figure 7C:
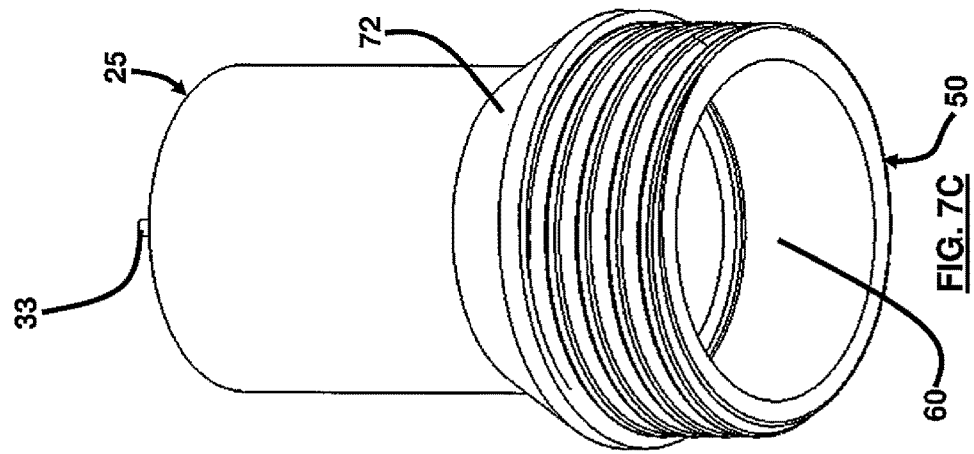
FIG. 7C is a perspective view of the plug of the training filter according to an embodiment herein.
Figure 7B:
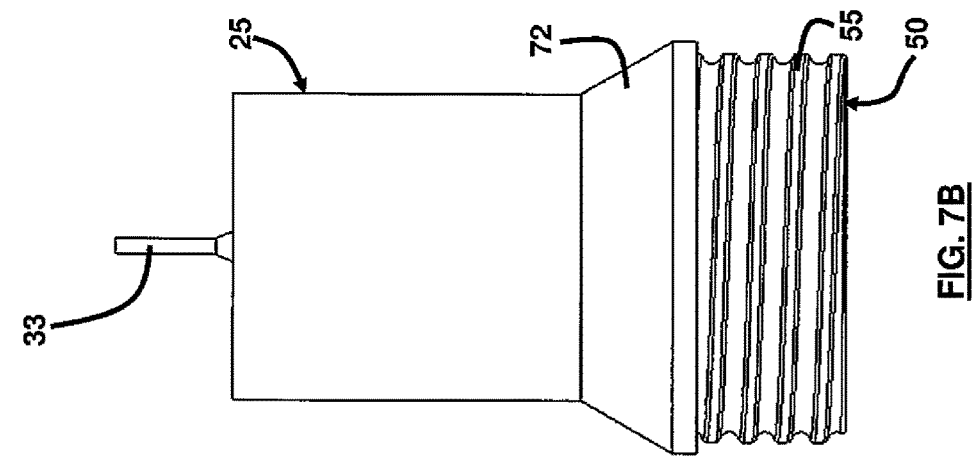
FIG. 7B is a side view of the plug of the training filter according to an embodiment herein.
Figure 7A:
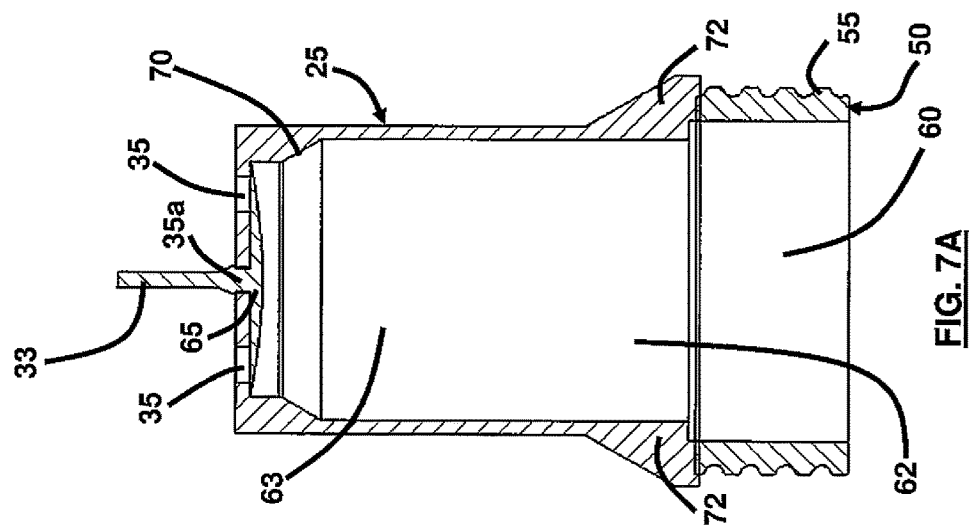
FIG. 7A is a cross-sectional view of the plug of the training filter according to an embodiment herein.

There are many different respirator filter canisters that could be simulated with a training filter. The embodiments herein describe using the C2A1 military filter. However, other types of filters could be used in accordance with the embodiments herein. FIGS. 1 through 6 illustrate various views of a training filter 5 in accordance with the embodiments herein. As generally shown in FIG. 1, the filter 5 comprises an upper (first) shell 10 adjoined to a lower (second) shell 15. The upper shell 10 comprises a generally tapered upper wall 20 configured with a substantially centrally positioned inlet port 23. As shown in FIG. 2, a series of beveled lips 21, 22 form the periphery of the upper wall 20. As shown in FIGS. 5 and 6, a plug 25 is seated within the inlet port 23 and extends through the filter 5. The plug 25 includes an upright stem 33 that forms part of a valve 65 such that the stem 33 extends outward from a top 30 wall of the plug 25. The valve 65 may comprise silicone in one embodiment. The stem 33 is configured to be positioned substantially central on the top wall or valve seat 30 (e.g., top wall or upper portion of the plug 25). A plurality of apertures 35 are configured in the top wall or valve seat 30 of the plug 25 surrounding the stem 33. The valve 65 is configured as a flapper valve according to an embodiment. The stem 33 is pulled through a center hole 35a (shown in FIG. 7A) in the valve seat 30 of the plug 25 to hold the valve 65 in place. The stem 33 is dimensioned and configured to allow a user to grab onto and pull the valve 33 into position. As shown in FIGS. 3 and 4, the lower shell 15 comprises a lower wall 45 that is offset and protruding outwards from a surrounding lip 40 that forms the periphery of the lower shell 15. An outwardly protruding connection mechanism 50 is positioned in a substantially central part of lower wall 45, wherein the connection mechanism 50 includes threads 55 that are dimensioned and configured to engage a complementary set of threads (not shown) on a respirator (not shown). The connection mechanism 50 is substantially hollow such that hole 60 is formed through the entire height of the connection mechanism 50 and up through the entire height of the lower shell 15 and a partial height of the upper shell 10, as shown in FIGS. 5 and 6. FIGS. 7A through 7C illustrate isolated views of the plug 25. The apertures 35 of the plug 25 allow air into a chamber or hollow breathing resistance core 63, which is defined by the plug 25 and positioned below the valve 65. The plug 25 further comprises a flared and tapered lower sidewall 72 that is adjacent to the connection mechanism 50. The lower sidewall 72 is configured to align with the lower shell 15 and allows the plug 25 to retain its position in the filter 5.

The plug 25 has a plurality of features to replicate the breathing resistance of a conventional commercial or military filter the training filter 5 is used to replace. The plug 25 further includes an angled sidewall 70 that flanks the hollow breathing resistance core 63. The apertures 35, valve 65, and sidewall 70 are collectively adapted and configured to match the breathing resistance of a conventional commercial or military filter. An air path 62 connects the breathing resistance core 63 to the hole 60 of the connection mechanism 50. This completes the air flow path from apertures 35 through the hollow breathing resistance core 63 and air path 62 then out of hole 60 of the connection mechanism 50 and into a connected respirator (not shown). The valve 65 is configured to open and close in order to control the flow of air from at least one aperture of the plurality of apertures 35 through the hollow breathing resistance core 63 and through the hole 60 of the connection mechanism 50. An air pocket 75 is configured through the upper shell 10 and lower shell 15 and abuts a ballast 80 that surrounds the plug 25 such that the ballast 80 adds weight to the filter 5, which is configured to allow the trainer filter 5 provided by the embodiments herein to replicate the weight of the commercial or military filters.

Figure 8:
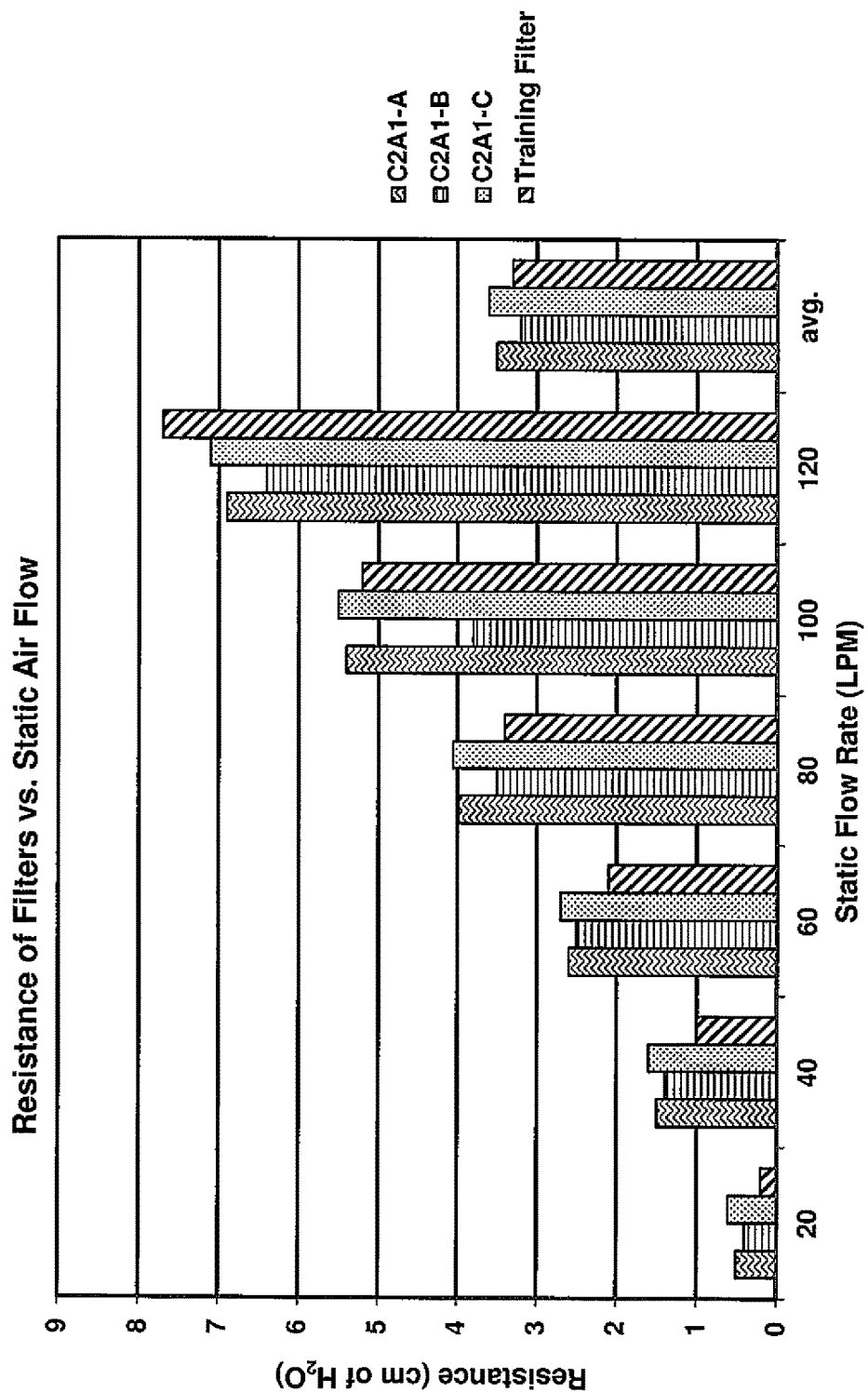
FIG. 8 is a graphical representation illustrating the resistance of training and actual filters vs. static air flow according to the embodiments herein.

To ensure that the breathing resistance of the training filter 5 matches with the conventional C2A1 filter, the pressure downstream of three C2A1 filters was experimentally measured. Pressure was recorded at air flow rates in 20 liter per minute (LPM) increments between 20-120 LPM. The comparison of the training filter 5 provided by the embodiments herein versus the three C2A1 filters (C2A1-A, C2A1-B, and C2A1-C) is shown in FIG. 8. As indicated in FIG. 8, the resistance of the training filter 5 is comparable to the conventional filters at various flow rates, which suggests that the training filter 5 provides similar functionality as actual filters, but without the drawbacks of using actual filters in training scenarios.

The training filter 5 provided by the embodiments herein can be used for training in place of the conventional C2A1 filters, which saves cost and allows a user to train indefinitely on a single training filter 5. Additionally, the training filter 5 eliminates the carbon bed common in conventional chemical filters. This removes any chance of the user breathing in dislodged carbon. Carbon can shed or become dislodged from impacts or damage to the filter canister during training, and can be a health hazard if ingested or inhaled by the user.

In other embodiments, the density and wall thickness of the upper shell 10, lower shell 15, plug 25, and ballast 80 can vary and be properly sized to attain the correct weight. Moreover, a different combination and configuration of apertures 35, port 23, valve 33, and sidewall 70 could be used to match the breathing resistance profile of a filter canister.

Figure 9:
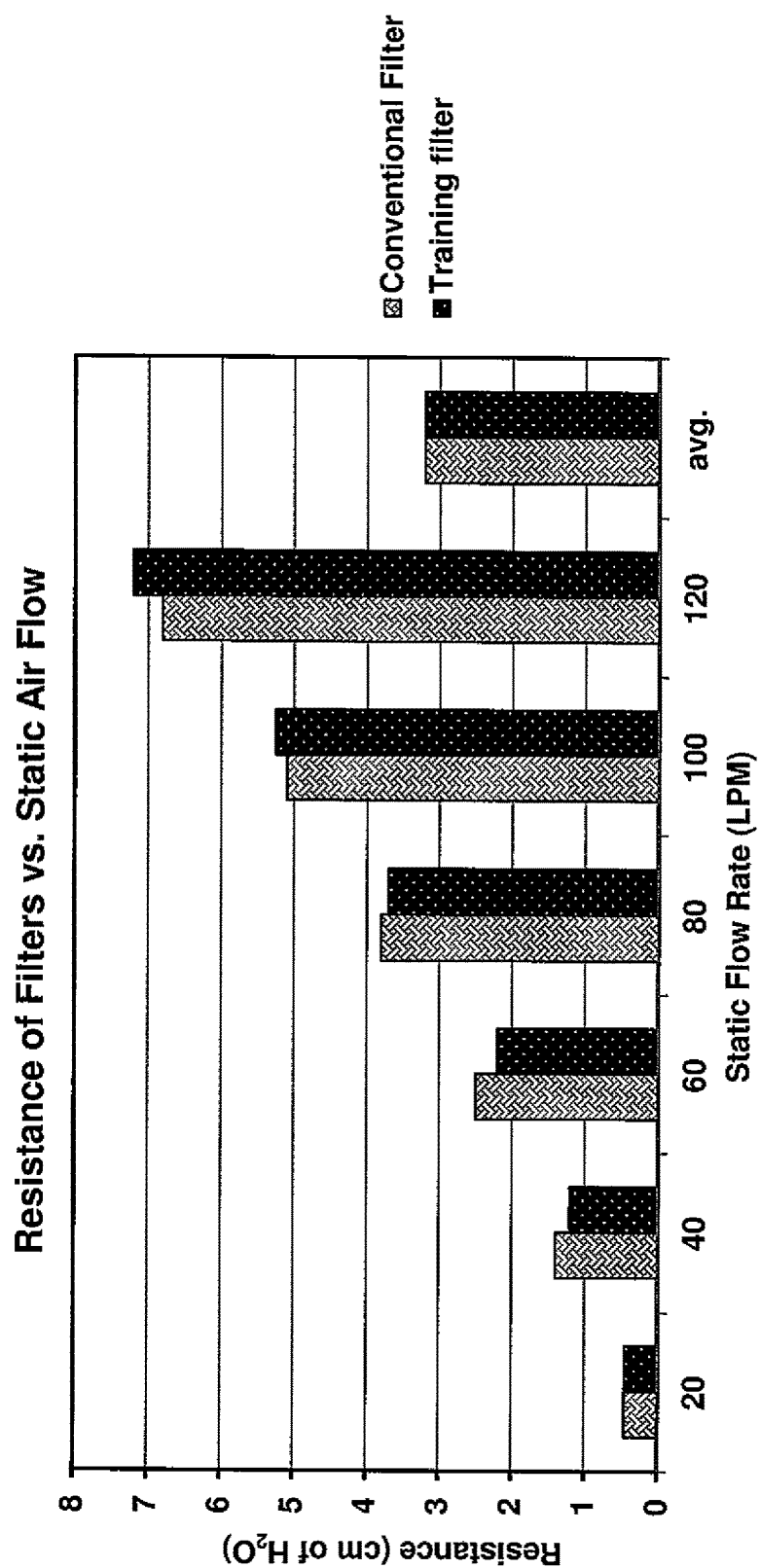
FIG. 9 is another graphical representation illustrating the resistance of training and actual filters vs. static air flow according to the embodiments herein.

FIG. 9 compares the measured resistance of a conventional Avon GPCF50 filter with the training filter 5 provided by the embodiments herein. Resistance measurements were recorded in the same fashion as the measurements presented for the C2A1 filters in FIG. 8. As indicated in FIG. 9, the resistance of the training filter 5 is comparable to the conventional filter at various flow rates, which suggests that the training filter 5 can be tuned to replicate other filter resistances and configurations as actual filters, but without the drawbacks of using actual filters in training scenarios.

The embodiments herein reduce filter consumption in training scenarios, which allows a user to become accustomed to wearing a respirator without the costs or risks of using an actual filter. The training filter 5 provides the same external ornamental shape, weight, and breathing resistance as a filter canister in a training filter housing. The breathing resistance is simulated by a series of apertures 35 and the valve 65, which at various breathing rates match the breathing resistance of an actual filter. Replacing the HEPA filtration media and carbon bed with the plug 25 having apertures 35, valve 65, and a hollow breathing resistance core 63 having tapered walls 70 allows the training filter 5 to duplicate the weight, size, shape, and breathing resistance of an actual filter and be reusable and cleanable, without a shelf life, unlike an actual filter.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A training filter, comprising:
    an upper shell having a central hole;
    a lower shell adjoined to said upper shell; and
    a plug positioned in said substantially central hole and extending through said lower shell, wherein said plug comprises:
        a top wall having a plurality of apertures;
        a valve adjacent to said top wall and said plurality of apertures;
        said plug defining a hollow breathing resistance core adjacent to said valve;
        an angled sidewall flanking said breathing resistance core adjacent said top wall; and
        a connection mechanism connected to said plug opposite the top wall.

2. The training filter of claim 1, wherein said valve comprises a stem outwardly extending from said top wall of said plug.

3. The training filter of claim 1, wherein said connection mechanism includes a hole creating a continuous air flow path from said plurality of apertures through said hollow breathing resistance core and through said connection mechanism.

4. The training filter of claim 1, further comprising a ballast surrounding said plug.

5. The training filter of claim 4, wherein said upper shell and said lower shell comprise an air pocket surrounding said ballast.

6. The training filter of claim 1, wherein said valve comprises a flapper valve.

7. The training filter of claim 1, wherein said valve and said angled sidewall are configured to alter a breathing resistance through said plug.

8. The training filter of claim 7, wherein said plurality of apertures is arranged in a pattern.

9. The training filter of claim 8, wherein said plurality of apertures and said angled sidewall are configured to match a breathing resistance of an actual filter.

10. The training filter of claim 9, wherein said angled sidewall, said pattern of said plurality of apertures, a predetermined number of said plurality of apertures, and said valve are configured to alter said breathing resistance.

11. The training filter of claim 1, wherein said connection mechanism is threaded and outwardly protrudes from said lower shell.

12. A reusable training filter, comprising:
    a first shell having a hole;
    a second shell adjoined to said first shell;
    a plug positioned in said hole and extending through said second shell, wherein said plug comprises:
        a valve seat comprising at least one aperture;
        a valve adjacent to said valve seat and said at least one aperture;
        said plug defining a hollow breathing resistance core adjacent to said valve;
        an angled upper sidewall flanking said breathing resistance core; and
        a connector connected to said plug;
    a ballast surrounding said plug,
    wherein said first shell and said second shell comprise an air pocket surrounding said ballast.

13. The training filter of claim 12, wherein said valve comprises a stem outwardly extending from said valve seat of said plug.

14. The training filter of claim 12, wherein said connector comprises a hole creating a continuous air path from said at least one aperture through said hollow breathing resistance core and through said connector.

15. The training filter of claim 12, wherein said valve comprises a flapper valve.

16. The training filter of claim 12, wherein said valve and said angled upper sidewall are configured to alter a breathing resistance through said plug.

17. The training filter of claim 16, wherein said at least one aperture comprises a plurality of apertures arranged in a pattern.

18. The training filter of claim 17, wherein said plurality of apertures and said angled upper sidewall are configured to match a breathing resistance of an actual filter.

19. The training filter of claim 18, wherein said angled upper sidewall, said pattern of said plurality of apertures, and a predetermined number of said plurality of apertures are configured to alter said breathing resistance.

20. The training filter of claim 12, wherein said connector is threaded and outwardly protrudes from said second shell.

21. The training filter of claim 12, wherein said training filter duplicates the weight, size, shape, and breathing resistance of an actual filter and is reusable and cleanable.

* * * * *